United States Patent
Maze et al.

(10) Patent No.: US 11,400,666 B2
(45) Date of Patent: Aug. 2, 2022

(54) LASER PROJECTION DEVICE AND METHOD FOR MANUFACTURING COMPOSITE MATERIAL PARTS BY DRAPE-MOLDING

(71) Applicant: Safran Nacelles, Gonfreville L'Orcher (FR)

(72) Inventors: Franck Maze, Gonfreville L'Orcher (FR); Maxime Coin, Gonfreville L'Orcher (FR); François Le Houerou, Gonfreville L'Orcher (FR)

(73) Assignee: Safran Nacelles, Gonfreville L'Orcher (FR)

( * ) Notice: Subject to any disclaimer, the term of this patent is extended or adjusted under 35 U.S.C. 154(b) by 646 days.

(21) Appl. No.: 16/453,265

(22) Filed: Jun. 26, 2019

(65) Prior Publication Data
US 2019/0389156 A1 Dec. 26, 2019

(30) Foreign Application Priority Data
Jun. 26, 2018 (FR) .................................... 18/55712

(51) Int. Cl.
| | |
|---|---|
| *G01B 11/25* | (2006.01) |
| *G01B 11/00* | (2006.01) |
| *B29C 70/54* | (2006.01) |
| *B29C 70/30* | (2006.01) |
| *G01B 21/04* | (2006.01) |

(52) U.S. Cl.
CPC ............. *B29C 70/54* (2013.01); *B29C 70/30* (2013.01); *G01B 11/002* (2013.01); *G01B 11/2504* (2013.01); *G01B 11/2513* (2013.01); *G01B 21/042* (2013.01)

(58) Field of Classification Search
CPC ....... B29C 70/54; B29C 70/30; G01B 11/002; G01B 11/2504; G01B 11/2513; G01B 21/042; G06V 20/64; G06V 10/44; G06V 20/52; G06V 20/647; G06T 7/521; G06T 7/62; G06T 7/0004; G06T 7/20; G06T 2207/10028; G06T 2207/30108
USPC ..................................... 356/601–623; 702/94
See application file for complete search history.

(56) References Cited

U.S. PATENT DOCUMENTS

| | | | |
|---|---|---|---|
| 5,506,683 A * | 4/1996 | Yang | G01B 11/2518 356/606 |
| 6,000,801 A | 12/1999 | Dillon et al. | |
| 6,055,056 A * | 4/2000 | Kuehmstedt | G01B 11/2504 356/243.4 |
| 6,549,288 B1 * | 4/2003 | Migdal | G01B 11/30 356/601 |
| 7,061,628 B2 * | 6/2006 | Franke | G01B 11/2504 356/604 |
| 10,679,367 B2 * | 6/2020 | McCloskey | G06V 20/64 |

(Continued)

FOREIGN PATENT DOCUMENTS

| | | |
|---|---|---|
| FR | 3006621 | 12/2014 |
| WO | 2003042924 | 5/2003 |

*Primary Examiner* — Isiaka O Akanbi
(74) *Attorney, Agent, or Firm* — Burris Law, PLLC

(57) ABSTRACT

A laser projection method and device for drape-molding a part on a mold includes encoders to determine the theoretical position of calibration patterns according to a displacement of the mold such that a laser projector is automatically recalibrated when the mold is repositioned during the drape-molding operation.

13 Claims, 2 Drawing Sheets

(56) References Cited

U.S. PATENT DOCUMENTS

| | | | |
|---|---|---|---|
| 2004/0145732 A1* | 7/2004 | Leikas | G01B 11/002 356/141.2 |
| 2005/0012056 A1* | 1/2005 | Leikas | G01B 11/24 250/559.19 |
| 2005/0013510 A1* | 1/2005 | Leikas | G06T 7/0004 382/309 |
| 2005/0123188 A1* | 6/2005 | Leikas | G01B 3/30 382/154 |
| 2006/0016957 A1* | 1/2006 | Hofmann | B23Q 15/013 250/201.1 |
| 2009/0097039 A1* | 4/2009 | Kawasaki | G06T 7/80 356/603 |

* cited by examiner

LASER PROJECTION DEVICE AND METHOD FOR MANUFACTURING COMPOSITE MATERIAL PARTS BY DRAPE-MOLDING

CROSS-REFERENCE TO RELATED APPLICATIONS

This application claims priority to and the benefit of FR 18/55712 filed on Jun. 26, 2018. The disclosure of the above application is incorporated herein by reference.

FIELD

The present disclosure relates to the field of manufacture of composite material parts by drape-molding, that is to say by depositing plies on a mold on which contours, delimiting areas for depositing plies, are projected, using one or several laser projector(s). The teachings of the present disclosure finds applications in particular in the aeronautical field, in particular to manufacture parts of aircrafts or nacelles of propulsion units.

BACKGROUND

The statements in this section merely provide background information related to the present disclosure and may not constitute prior art.

During a manual drape-molding operation, laser projector (s) are typically manually calibrated after positioning a mold in a position enabling an operator to deposit plies thereon. A manual calibration of a laser projector may take several minutes, typically about fifteen minutes.

In order to drape-mold some large parts, it may be necessary to reposition the mold, in particular to avoid the operator positioning himself in non-ergonomic body positions.

Each repositioning of the mold requires recalibrating the laser projector(s), thus extending the duration of the drape-molding operation. The inventors estimate that about fifty mold repositionings are necessary for some nacelle parts such as thrust reverser cowls.

SUMMARY

The present disclosure provides a device and a method for manufacturing composite material parts, allowing in particular reducing the manufacturing time for composite parts.

According to one form of the present disclosure, a laser projection device for drape-molding a part on a mold with plies includes:
  a support allowing positioning the mold for the drape-molding, this support comprising a fixed element and a movable element capable of modifying the spatial arrangement of the mold relative to this fixed element,
  at least one laser projector arranged to draw, on the mold, contours delimiting areas for depositing the plies,
  calibration patterns adapted to be attached on the mold and/or on the movable element of the support, the projector comprising a detection system arranged to detect the calibration patterns, and
  a computer programmed to determine the position, relative to the projector, of the calibration patterns detected by the detection system, and to determine the spatial arrangement of the mold according to the position of the calibration patterns.

According to the teachings of the present disclosure, the laser projection device further comprises one or several encoder(s) arranged to measure a displacement of the movable element relative to the fixed element. The computer is programmed to determine the theoretical position of the calibration patterns according to a displacement of the movable element measured by the encoder(s), so as to determine the spatial arrangement of the mold when said spatial arrangement has been modified by displacing the movable element.

The combination of these different features and in particular the use of the information delivered by the encoder(s) allow automatically calibrating the laser projector(s) after repositioning the mold. This automatic calibration, which includes determining the spatial arrangement of the mold, is indeed made possible by the computer taking into account the measured displacement of the movable element which allows determining the theoretical position of the calibration patterns.

The teachings of the present disclosure can thus be applied to eliminate a manual recalibration step after repositioning the mold.

In one form, the displacement of the movable element is automated, that is to say that the computer is programmed to drive the displacement of the movable element such that the contours drawn on the mold define deposition areas, thereby enabling an operator to drape-mold a part on the mold by placing himself/herself in an ergonomic position. The drape-molding operation is thus enhanced in terms ergonomics.

The laser projection device may nonetheless be arranged or programmed to provide a manual displacement of the movable element by the operator to enable the operator to define or adjust his/her working position from the spatial arrangement of the mold which precedes or is reached after an automated displacement of the movable element.

Consequently, the automation of the displacement of the movable element can be full, zero or partial.

In one form of the present disclosure, the device may comprise a linear encoder adapted to measure a translational displacement of the movable element and/or a rotary encoder adapted to measure a rotational displacement of the movable element and/or several linear and/or rotary encoder(s). In one form, the parts to be manufactured by drape-molding are in the aeronautical field, and a linear encoder and a rotary encoder may thus be used.

According to another form of the present disclosure, a method for laser projection on a mold is provided. The method comprises an initial positioning of the mold using a support including a fixed element and a movable element. The movable element is arranged to modify the spatial arrangement of the mold relative to the fixed element. The method also comprises an attachment of calibration patterns on the mold and/or on the movable element of the support, and further comprises a first series of steps including:
  a step of detecting one or more of the calibration patterns using a detection system of a laser projector,
  a step of determining, using a computer, the actual position, relative to the projector, of the calibration patterns detected by the detection system,
  a step of determining, using the computer, the spatial arrangement of the mold according to the actual position of the calibration patterns, and
  a laser projection step, using the projector, so as to draw, on the mold, contours delimiting at least one area for depositing at least one ply.

According to one form of the present disclosure, the laser projection method comprises a second series of steps including:
- a step of displacing the movable element relative to the fixed element so as to modify the spatial arrangement of the mold,
- a step of measuring, using one or several encoder(s), the displacement of the movable element, and
- a step of determining, using the computer, the theoretical position of the calibration patterns according to the displacement of the movable element measured by the encoder(s).

In some aspects, the steps of the first series are repeated after the steps of the second series.

This method confers the same aforementioned advantages as the laser projection device described above.

According to a first variant, the second series of steps may comprise, after the step of determining the theoretical position of the calibration patterns, a timing step allowing delaying the implementation of the first series of steps. The timing step in one form has a predetermined duration less than four seconds, for example, equal to two seconds.

According to a second variant, the timing step may be replaced by a step of waiting for an order allowing triggering the first series of steps only after an order given by an operator, for example when said operator presses on a button.

According to a third variant, the two variants just described may be combined such that, if the operator presses on a button before elapse of the predetermined duration, the first series of steps is forcibly implemented, that is to say before elapse of the entire predetermined time duration.

In another form of the present disclosure, a method according to the first or third variant is provided such that it is possible to check, during the timing step, whether the encoder(s) measure a displacement of the movable element. In this case, if the encoder(s) measure a displacement of the movable element, the timing step is in one form repeated.

Advantageously, the first series of steps may comprise, after the step of determining the actual position of the detected calibration patterns:
- a step of determining a number of calibration patterns detectable by the detection system according to the actual position of the detected calibration patterns,
- a step of determining the number of defective or out of tolerance calibration patterns according to the number of detectable calibration patterns and the number of detected calibration patterns, and
- an alerting step indicating the presence of one or several out of tolerance calibration pattern(s) when at least one out of tolerance calibration pattern has been determined, the first series of steps being, in this case, restarted after a predetermined time duration or after receiving an instruction for resuming the method, by the computer, which may be in the form of an order given by the operator by pressing on a button.

In one form, the first series of steps may comprise, after the step of detecting calibration patterns, an alerting step indicating an inadequate positioning of the mold and/or the support when the number of detected calibration patterns is less than a predetermined number. The first series of steps is, in this case, restarted after a predetermined duration or after receiving an instruction for resuming the method, by the computer. This instruction may include an order given by the operator by pressing on a button.

According to a third aspect, the present disclosure provides a method for drape-molding a part on a mold with plies, implementing the laser projection method described above and wherein, after the laser projection step, at least one ply is deposited on the at least one deposition area of the mold.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
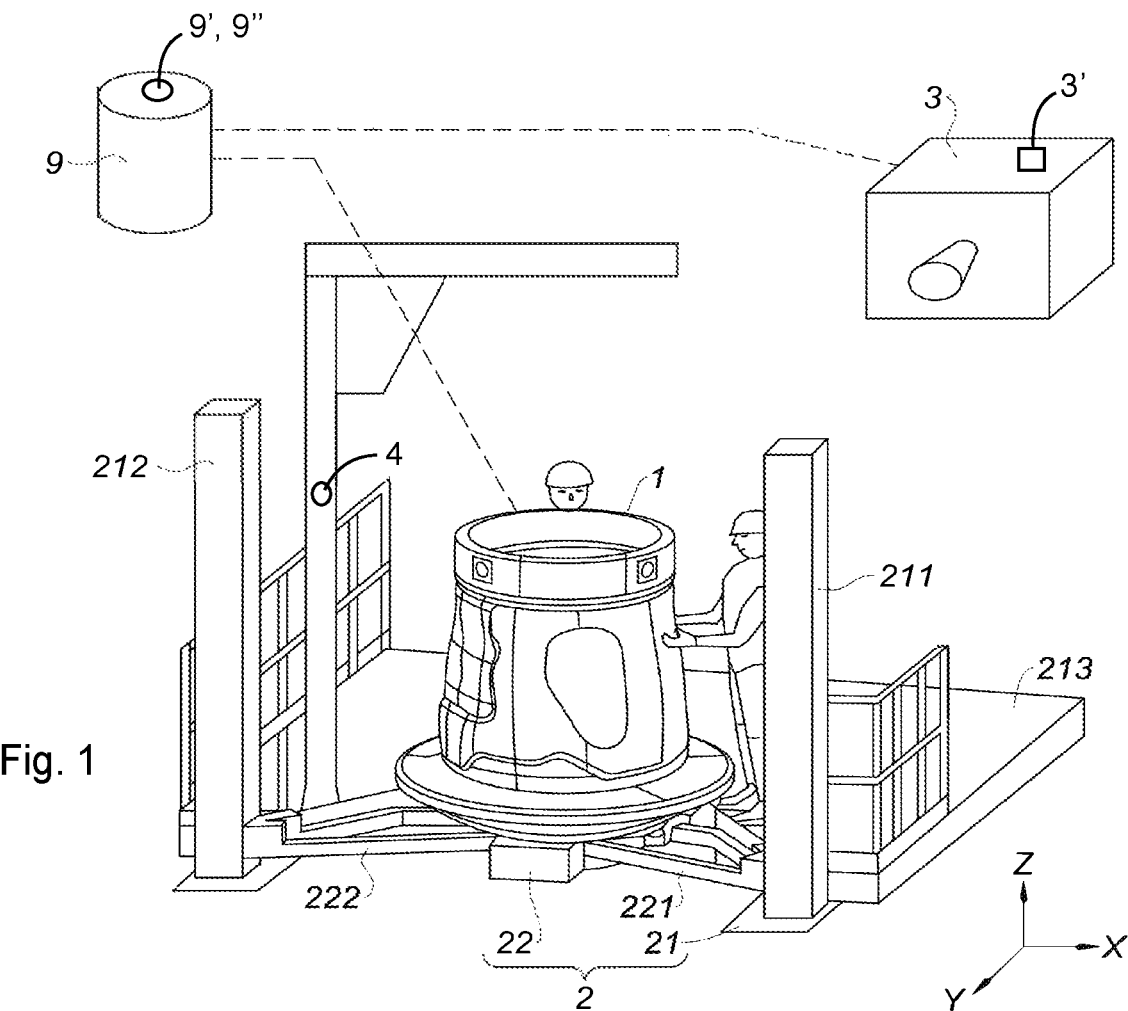
FIG. 1 is a schematic view of a laser projection device according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a laser projection device in accordance with the teachings of the present disclosure. This device comprises a mold 1 constituting a drape-molding tooling. This mold 1 comprises a surface over which plies can be deposited so as to constitute a composite material part. Typically, after manual deposition of pre-impregnated plies, the set undergoes a polymerization step in an autoclave. The present disclosure more specifically concerns the drape-molding operation (also known as drape forming) as such, that is to say the operation including depositing the plies on the mold 1.

For this purpose, the device comprises a support 2 allowing positioning the mold 1 for drape-molding.

The support 2 comprises a fixed element 21. In this example, the fixed element 21 comprises beams 211 and 212 secured to a platform 213 fastened or stably connected to the ground.

Also, the support 2 comprises a movable element 22 capable of changing the spatial arrangement of the mold 1 relative to the fixed element 21.

In this example, the movable element 22 is movable in translation in the direction Z, along which the beams 211 and 212 extend. The movable element 22 may comprise, to this end, arms 221 and 222 arranged to slide in grooves (not represented) of the beams 211 and 212.

In this particular example, the element 22 is also movable in rotation about the direction Z via a slew ring (not represented) or any other suitable means. The displacement of the movable element 22, in translation and/or in rotation, is in one form driven via a computer 9 which may comprise pre-programmed instructions for displacing the movable element 22 and/or with which an operator can interact with in order to drive the displacement of the movable element 22 in a desired manner.

Figure 2:
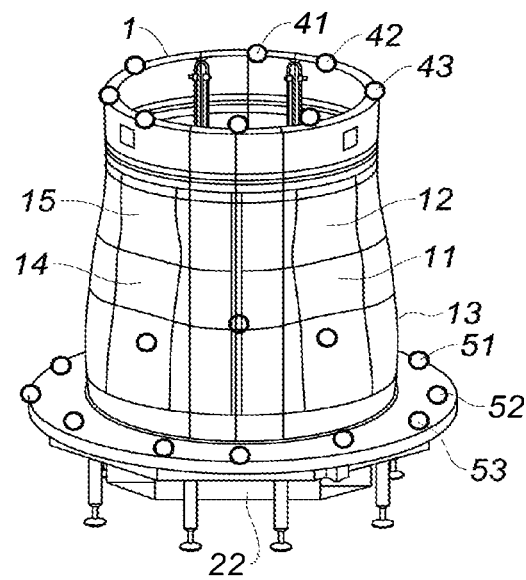
FIG. 2 is a schematic view of a mold of a device according to the teachings of the present disclosure, provided with calibration patterns.

The laser projection device may comprise one or several laser projector(s). In this example, it comprises one single laser projector 3 arranged to draw, on the mold 1, contours delimiting areas for depositing the plies. FIG. 2 shows such deposition areas 11 to 15.

FIG. 2 also shows calibration patterns 41-43 (also referred to herein simply as "patterns") attached on an upper portion of the mold 1, as well as calibration patterns 51-53 attached on a lower portion of the mold 1.

The projector 3 comprises a detection system 3' arranged to detect the patterns 41-43, 51-53.

Figure 3:
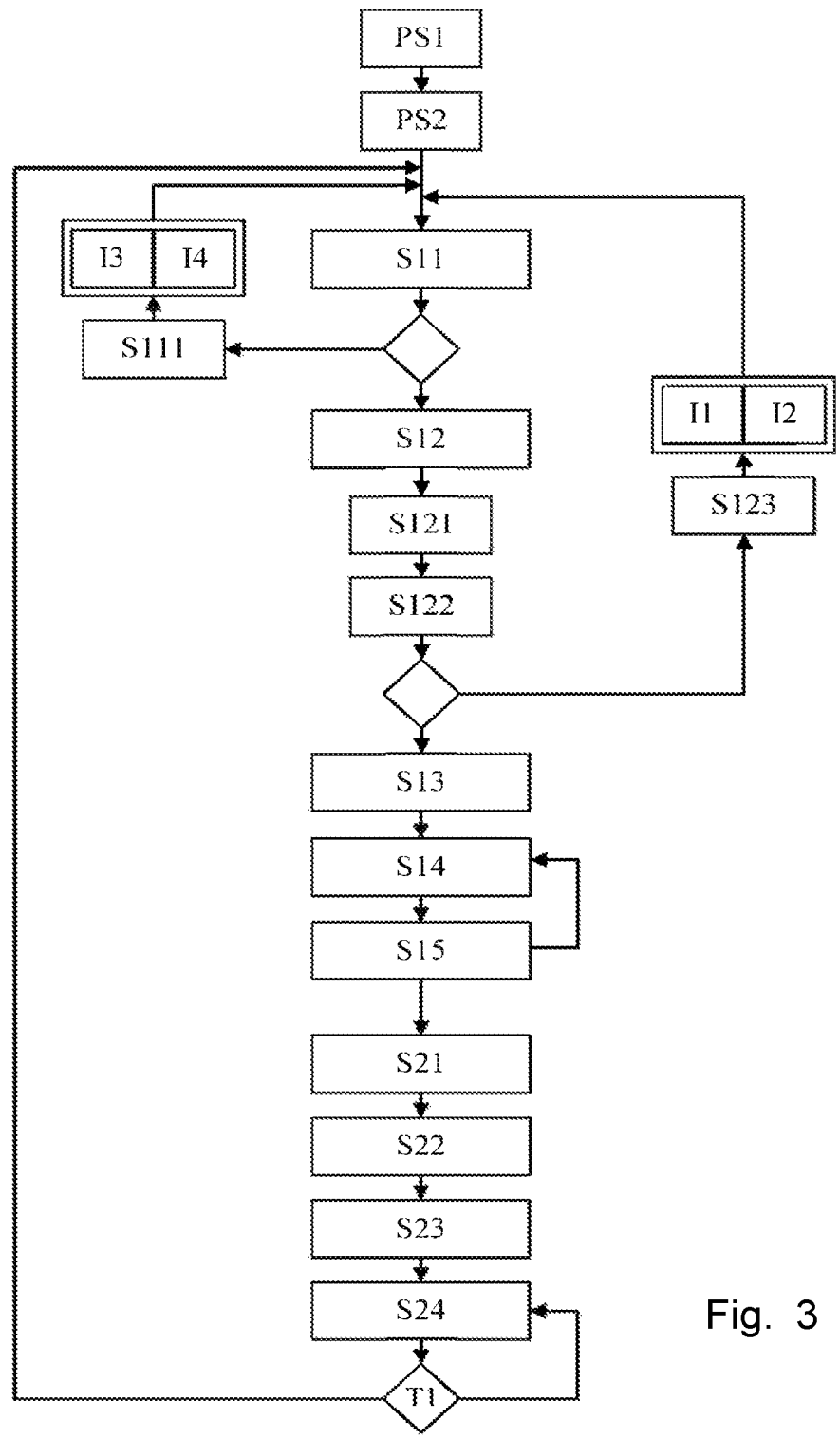
FIG. 3 is a flowchart representing steps of a laser projection method according to the teachings of the present disclosure.

During an initial phase, the mold 1 is positioned in an initial position on the movable element 22 of the support 2 (step PS1 in FIG. 3). Step PS1 of initial positioning of the mold 1 and step PS2 of attaching the patterns on the mold 1 may be carried out in the chronological order indicated in FIG. 3 or in the reverse order.

In this example, when the mold 1 is in the initial position, the projector 3 is automatically calibrated.

Alternatively, it may be considered to manually carry out this initial calibration according to any known technique. Typically in this case, an operator manually orientates the projector 3 so as to target, one by one, the calibration patterns or at least one portion of the visible patterns according to the respective position of the projector 3, the patterns and the mold 1.

According to the teachings of the present disclosure, the device further comprises encoders 9', 9". In this example, a linear encoder 9' is used to measure a translational displacement of the movable element 22, along the direction Z, and a rotary encoder 9" to measure a rotational displacement of the movable element 22, about the direction Z.

When the mold 1 is in the initial position, the encoders 9', 9" are in one form initialized in the zero position.

Referring to FIG. 3, an example of a sequence of steps in accordance with the teachings of the present disclosure is described below, these steps being carried out at the end of the initial phase that has just been described.

At a step S11, the detection system 3' of the projector 3 is used to detect one or more of said patterns 41-43, 51-53.

Optionally, at the end of step S11 of detecting patterns, it is possible to implement an alerting step S111 in order to indicate, when the number of detected patterns is less than a predetermined number, that the positioning of the mold 1 and/or the support 2 is inadequate. If this is the case, after a predetermined time duration I3 or after receiving, by the computer 9, an instruction I4 for resuming the method, the detection step S11 is restarted. The instruction I4 may include an order given by an operator by pressing on a button 4 or switch, among others (not represented). It should be understood that the button 4 is in communication with the computer 9.

After the detection step S11, when the number of detected patterns is equal to or larger than said predetermined number (if the alerting step S111 is implemented), a step S12 is implemented, in which the computer 9 determines the actual position, relative to the projector 3, of the patterns 41-43, 51-53 detected by the detection system.

Based on the actual position of the patterns 41-43, 51-53, the computer 9 can then determine the spatial arrangement in which the mold 1 is located (step S13), bearing in mind that the computer 9 comprises a model of the mold 1 and knows the position of the patterns 41-43, 51-53 on the mold 1.

Nonetheless, before carrying out this step S13 of determining the spatial arrangement of the mold 1, it is possible to check whether the patterns are defective or out of tolerance by implementing:
- a step S121 of determining a number of patterns detectable by the detection system 9' according to the actual position of the detected patterns,
- a step S122 of determining the number of out of tolerance patterns according to the number of detectable patterns and the number of detected patterns, and
- an alerting step S123 indicating the presence of one or several out of tolerance pattern(s) when at least one out of tolerance pattern has been determined.

In case of presence of at least one out of tolerance pattern, the detection step S11 is resumed either after a predetermined time duration I1 or after receiving, by the computer 9, a resumption instruction I2. The instruction I2 may be in the form of an order given by the operator, e.g., by pressing on a button 4.

When the computer 9 has determined the spatial arrangement of the mold 1 during step S13, then a laser projection step S14 is carried out, using the projector 3, so as to draw, on the mold 1, contours delimiting areas for depositing plies.

The contours may be drawn so as to successively and/or simultaneously delimit several deposition areas 11-15.

One or several operators can then deposit plies on the corresponding deposition areas (step S15).

When the mold 1 should be displaced in order to enable a plies deposition in ergonomic conditions, the movable element 22 of the support 2 is displaced relative to the fixed element 21 so as to modify the spatial arrangement of the mold 1 (step S21).

In one form, the displacement of the movable element 22 during this step S21 is automated and the computer 9 can be programmed, for this purpose, to automatically control this action.

When the displacement step S21 is automated, the start of this step is in one form manually triggered by an operator, for example via an order given to the computer 9 via a button 4. Alternatively, it is also possible to initiate this step S21 automatically after a predetermined duration.

Some flexibility may also be considered by enabling the operator to manually drive the displacement of the movable element 22, at least to a degree which does not interfere with the ability of the device to automatically recalibrate the projector 3 according to the procedure described hereinbelow.

In order to carry out an automatic recalibration, after displacing the movable element 22 during step S21, the following steps are implemented in this example:
- a step S22 of measuring, using the encoders 9', 9", the displacement of the movable element 22,
- a step S23 of determining, using the computer 9, the theoretical position of the patterns 41-43 and 51-53 according to the displacement of the movable element 22 measured by the encoders,
- a step S24 either of timing (elapse of a predetermined time duration) or of waiting for an order from an operator, for example when the latter presses on a button 4, and optionally, a check-up T1 of a possible displacement measured by the encoders 9', 9" during the timing step S24, step S24 being repeated if the encoders measure a displacement of the movable element 22.

At the end of step S23, the computer 9 knows the theoretical position of the patterns 41-43 and 51-53. The detection of the patterns then carried out during step S11 can thus be carried out without a manual recalibration. The method according to the teachings of the present disclosure thus provides a method for automatic recalibration of the projector 3 after modification of the spatial arrangement of the mold 1.

The teachings of the present disclosure are not limited to the examples which have just been described and many adjustments can be made to these examples without departing from the scope thereof. For example, the laser projection may be carried out using several projectors (not represented), which can in particular allow increasing the number of plies that may be deposited on the mold 1 without modification of its spatial arrangement.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A laser projection device for drape-molding a part on a mold with plies, the laser projection device comprising:
   a support allowing positioning the mold for drape-molding, wherein the support comprises a fixed element and a movable element capable of modifying the spatial arrangement of the mold relative to the fixed element;
   at least one laser projector arranged to draw contours on the mold, in order to delimit areas for depositing the plies;
   calibration patterns adapted to be attached on the mold, wherein the projector comprises a detection system arranged to detect the calibration patterns; and
   a computer programmed to determine a position of the calibration patterns detected by the detection system, relative to the projector, and to determine a spatial arrangement of the mold according to the position of the calibration patterns,
   wherein the laser projection device further comprises at least one encoder arranged to measure a displacement of the movable element relative to the fixed element, and the computer is programmed to determine a theoretical position of the calibration patterns according to a displacement of the movable element measured by the encoder, so as to determine a spatial arrangement of the mold when said spatial arrangement has been modified by displacing the movable element.

2. The device according to claim 1, comprising a linear encoder adapted to measure a translational displacement of the movable element and a rotary encoder adapted to measure a rotational displacement of the movable element.

3. A method for laser projection on a mold, comprising an initial positioning of the mold using a support, wherein the support includes a fixed element and a movable element arranged to modify a spatial arrangement of the mold relative to the fixed element, and a fastening of calibration patterns on the mold, wherein the method comprises a first series of steps including:
   a step of detecting one or more of said calibration patterns using a detection system of a laser projector;
   a step of determining an actual position of the calibration patterns detected by the detection system, relative to the projector, using a computer;
   a step of determining a spatial arrangement of the mold according to the actual position of the calibration patterns, using the computer; and
   a laser projection step, using the projector, so as to draw contours on the mold, wherein said contours delimit at least one area for depositing at least one ply,
   wherein the method comprises a second series of steps including:
   a step of displacing the movable element relative to the fixed element so as to modify the spatial arrangement of the mold;
   a step of measuring the displacement of the movable element, using at least one encoder; and
   a step of determining the theoretical position of the calibration patterns according to the displacement of the movable element measured by the encoder, using the computer,
   wherein the steps of the first series are repeated after the steps of the second series.

4. The laser projection method according to claim 3, wherein the second series of steps comprises, after the step of determining the theoretical position of the patterns, a timing step allowing delaying the implementation of the first series of steps, the timing step having a predetermined time duration less than four seconds.

5. The laser projection method according to claim 4, wherein the predetermined time duration is less than two seconds.

6. The laser projection method according to claim 4, wherein a check is performed during the timing step, whether the encoder measures a displacement of the movable element, and wherein the timing step is repeated if the encoder measures a displacement of the movable element.

7. The laser projection method according to claim 3, wherein the first series of steps comprises, after the step of determining the actual position of the detected patterns:
   a step of determining a number of calibration patterns detectable by the detection system according to the actual position of the detected calibration patterns;
   a step of determining the number of out of tolerance calibration patterns according to the number of detectable calibration patterns and the number of detected calibration patterns; and
   an alerting step indicating the presence of one or several out of tolerance calibration pattern(s) when at least one out of tolerance calibration pattern has been determined, the first series of steps being, in this case, restarted after a predetermined time duration, by the computer.

8. The laser projection method according to claim 3, wherein the first series of steps comprises, after the step of detecting patterns, an alerting step indicating an inadequate positioning of the mold when the number of detected calibration patterns is less than a predetermined number, and restarting the first series of steps after a predetermined time duration, by the computer.

9. The laser projection method according to claim 3 further comprising depositing at least one ply on the at least one deposition area of the mold after the laser projection step.

10. The laser projection method according to claim 3, wherein the first series of steps comprises, after the step of determining the actual position of the detected patterns:
- a step of determining a number of calibration patterns detectable by the detection system according to the actual position of the detected calibration patterns;
- a step of determining the number of out of tolerance calibration patterns according to the number of detectable calibration patterns and the number of detected calibration patterns;
- an alerting step indicating the presence of one or several out of tolerance calibration pattern(s) when at least one out of tolerance calibration pattern has been determined; and
- restarting the first series of steps after receiving an instruction for resuming the method, by the computer.

11. The laser projection method according to claim 3, wherein the first series of steps comprises, after the step of detecting patterns, an alerting step indicating an inadequate positioning of the support when the number of detected calibration patterns is less than a predetermined number, and
- restarting the first series of steps after receiving an instruction for resuming the method, by the computer.

12. A laser projection device for drape-molding a part on a mold with plies, the laser projection device comprising:
- a support configured to position the mold for drape-molding, wherein the support comprises a fixed element and a movable element configured to modify the spatial arrangement of the mold relative to the fixed element;
- at least one laser projector arranged to draw contours on the mold, in order to delimit areas for depositing the plies;
- calibration patterns configured to be attached on the movable element of the support, wherein the projector comprises a detection system arranged to detect the patterns; and
- a computer programmed to determine a position of the calibration patterns detected by the detection system, relative to the projector, and to determine a spatial arrangement of the mold according to the position of the patterns,
wherein the laser projection device further comprises at least one encoder arranged to measure a displacement of the movable element relative to the fixed element, and the computer is programmed to determine a theoretical position of the patterns according to a displacement of the movable element measured by the encoder, so as to determine a spatial arrangement of the mold when said spatial arrangement has been modified by displacing the movable element.

13. A method for laser projection on a mold comprising an initial positioning of the mold using a support, wherein the support includes a fixed element and a movable element configured to modify a spatial arrangement of the mold relative to the fixed element, and a fastening of calibration patterns on the movable element of the support, wherein the method comprises a first series of steps including:
- a step of detecting one or more of said calibration patterns using a detection system of a laser projector;
- a step of determining an actual position of the calibration patterns detected by the detection system, relative to the projector, using a computer;
- a step of determining a spatial arrangement of the mold according to the actual position of the calibration patterns, using the computer; and
- a laser projection step, using the projector, so as to draw contours on the mold, wherein said contours delimit at least one area for depositing at least one ply,
wherein the method comprises a second series of steps including:
- a step of displacing the movable element relative to the fixed element so as to modify the spatial arrangement of the mold;
- a step of measuring the displacement of the movable element, using at least one encoder;
- a step of determining the theoretical position of the calibration patterns according to the displacement of the movable element measured by the encoder, using the computer;
and in that the steps of the first series are repeated after the steps of the second series.

* * * * *